United States Patent
Sanada

[19]

[11] Patent Number: 6,155,856
[45] Date of Patent: Dec. 5, 2000

[54] ELECTRONIC CONTROL UNIT WITH ELECTRICAL CONNECTOR

[75] Inventor: Satoshi Sanada, Osaka, Japan

[73] Assignee: Sumitomo Electric Industries, Ltd., Osaka, Japan

[21] Appl. No.: 09/440,082

[22] Filed: Nov. 15, 1999

[30] Foreign Application Priority Data

Nov. 24, 1998 [JP] Japan .................................. 10-332205

[51] Int. Cl.[7] .................................................. H01R 13/64
[52] U.S. Cl. ........................... 439/246; 439/76.1; 439/78; 439/81
[58] Field of Search ............................... 439/246, 78, 81, 439/83, 76.1, 76.2, 733.1

[56] References Cited

U.S. PATENT DOCUMENTS

| | | | |
|---|---|---|---|
| 4,012,094 | 3/1977 | VanRenssen et al. ................. | 439/76.1 |
| 4,722,691 | 2/1988 | Gladd et al. ........................... | 439/76.1 |
| 4,738,631 | 4/1988 | Takahashi et al. ..................... | 439/246 |
| 4,775,333 | 10/1988 | Grider et al. .......................... | 439/76.1 |
| 5,452,948 | 9/1995 | Cooper et al. ......................... | 303/119.2 |

*Primary Examiner*—Paula Bradley
*Assistant Examiner*—Tho D. Ta
*Attorney, Agent, or Firm*—Greenblum & Bernstein, P.L.C.

[57] ABSTRACT

An electronic control unit has a connector intervening between an external load and a printed circuit board inside the unit housing including a circuit casing and a connector casing both formed integrally therewith. At least one connector terminal of the connector is provided with a buffering portion effective to absorb an external stress. This connector terminal can be accurately and precisely constrained in a housing and can provide a stabilized electrical connection with a high workability.

3 Claims, 3 Drawing Sheets

ELECTRONIC CONTROL UNIT WITH ELECTRICAL CONNECTOR

BACKGROUND OF THE INVENTION

1. Field of the Invention

The present invention generally relates to an electronic control unit of a kind required to have a waterproof structure suitable for use in an automobile and, more particularly, to the electronic control unit equipped with at least one electrical input/output connector having a plurality of terminal members adapted to be connected directly with a printed circuit board.

2. Description of the Prior Art

The electrical plug-in connector assembly providing for the input and output of one or both of an electrical power and electrical signals to the separate device has long been well known, which is generally made up of a plug-in connector and a socket connector for receiving the plug-in connector. While the plug-in connector assembly is available in various types, the present invention makes use of the type comprising the plug-in connector having a plurality of terminal sheaths and the socket connector having a corresponding number of connector terminals which are connected at one end to a printed circuit board by means of soldering and which are, when the plug-in connector is plugged into the socket connector, engaged or plugged into the associated terminal sheaths to establish electric circuits between the connector terminals and the terminal sheaths.

In this particular type of the plug-in connector assembly, it is well understood that whenever the plug-in connector is plugged in or removed from the socket connector, a compressive or tensile load act on the printed circuit board, respectively. Where the socket connector is fixed in position with the connector terminals electrically connected directly with the printed circuit board through electrical joints formed by, for example, soldering, repeated application of the alternating compressive and tensile loads to the printed circuit board will eventually result in degradation of the reliability of the printed circuit board. Accordingly, it is a general practice to mount the plug-in connector and the printed circuit board separately on a housing of the electronic control unit in order to secure a highly reliable electronic control unit.

In the structure in which the socket connector and the printed circuit board are fixed separately in the housing of the electronic control unit, the tensile load which would be brought about when the plug-in connector is removed from the socket connector will not be transmitted to the printed circuit board. However, the difference between the coefficient of thermal expansion of a material for the connector terminals in the socket connector and that of a material for the printed circuit board is apt to allow thermal stresses to develop at the solder joints which eventually leads to material fatigue at the solder joints. Once this occurs, breakage is likely to result in at one or some of the solder joints.

FIG. 4 illustrates one of the conventional methods of accomplishing an electrical connection between one of the connector terminals and the printed circuit board. As shown therein, a control unit housing 100 is made of a synthetic resin and has a connector casing 101 and a circuit casing 103 formed integrally therewith with a partition wall intervening therebetween. The connector casing 101 has a socket defined therein so as to open upwardly for receiving a plug-in connector not shown. The illustrated socket connector also includes a plurality of straight connector terminals, only one of which is shown by 102, that are fixed in position by interference fit or insert-molding so as to extend through the partition wall of the control unit housing 100. The straight connector terminals 102 thus have one end positioned inside the socket in the connector casing 101 and the opposite end positioned inside the circuit casing 103. A printed circuit board 105 is housed within and secured to the circuit casing 103 by means of a plurality of set screws, only one of which is shown by 104, that are screwed into an inwardly protruding peripheral portion 106 integral with the circuit casing 103. Those ends of the straight connector terminals 102 within the circuit casing 103 are pierced through corresponding holes in the printed circuit board 105 and are then soldered at 102a to circuit elements on the printed circuit board 105.

According to the connection shown in FIG. 4, the connector terminals 102 are simple in shape and can easily and accurately soldered to the printed circuit board 105. However, considering that the control unit housing 100 including the circuit casing 103 is made of the synthetic resin whereas the connector terminals 102 are made of, for example, brass having a good conductivity, each time the ambient temperature inside a space h delimited between the wall of the circuit casing 103, a part of which concurrently serves as the partition wall between the connector casing 101 and the circuit casing 103, and the printed circuit board 105 undergoes change, the solder joints 102a tends to be pulled laterally due to the peripheral portion 106 and, hence, the circuit casing 103 having a larger coefficient of thermal expansion, which would eventually results in failure of some or all of the solder joints 102a to conduct an electrical current therethrough.

In order to avoid the problem inherent in the structure shown in and described with reference to FIG. 4, an attempt has largely been made to provide each connector terminal of the socket connector with a deformable portion. By way of example, as shown in FIG. 5l the use is made of a connector subassembly 200 comprising a connector casing 201, separate from and independent of the circuit casing 103, and a plurality of connector terminals 202, that are fixed in position by interference fit or insert-molding so as to extend through a wall of the connector casing 201. The connector terminals 202 are so bent into a generally L-shaped configuration as to define the deformable portion so that in the assembled condition, neither the compressive load nor the tensile load will be transmitted to the solder joints 202a.

The connector subassembly 200 of the structure described above is fixedly secured to the circuit casing 103 with the connector terminals 202 extending into the circuit casing 103 through one or more perforations defined in a wall of the circuit casing 103 and then soldered at 202a to the printed circuit board 105 in a manner similar to that described in connection with the structure of FIG. 4. As is the case with the structure shown in FIG. 4, the printed circuit board 105 is supported within the circuit casing 103 by means of a plurality of set screws 104 screwed into the inwardly protruding peripheral portion 106 integral with the circuit casing 103.

In the structure shown in and described with reference to FIG. 5, change in dimension due to the difference in coefficient of thermal expansion between the connector terminals 202 and the control unit housing 100, which change tends to be brought about by change in ambient temperature inside the circuit housing 103, can be effectively absorbed by the resiliency of the deformable portion of each connector terminal 202. Consequently, no external force can be transmitted to the solder joint 202a to thereby avoid the possibility of electrical disconnection between the connector terminals 202 and the corresponding circuit elements on the printed circuit board 105.

To complete the control unit housing 100, however, the structure shown in FIG. 5 requires the use of the separate casings 103 and 201 which tends to increase the cost of manufacture. In addition, where the waterproof design is required, the use of the separate casings 103 and 201 requires a seal to be employed between these casings. Accordingly, not only does the cost of manufacture increase additionally, but also the use of the waterproof seal may constitute a cause of reduction in reliability. Where the fluid tightness is of an paramount importance, the electronic control unit should have the connector casing as a unitary part of the control unit housing 100 together with the circuit casing 103.

However, another problem will arise if the connector casing 201 is formed integrally with the control unit housing 100 together with the circuit casing 103, which will now be discussed with reference to FIG. 6.

The control unit housing 100 shown in FIG. 6 has the partition wall dividing it into the connector casing 101 and the circuit casing 103, both of which is a unitary part of the control unit housing 100. When it comes to press-fitting of the L-shaped connector terminals 202 across the partition wall, the socket in the connector casing 101 has such a limited capacity that each connector terminal 202 cannot be passed through the partition wall with its opposite ends positioned on respective sides of the partition wall. Accordingly, it would be a reasonable way to insert each connector terminal 202 from the interior of the circuit casing 103 instead of from the socket in the connector casing 201, in which case a wall portion of the circuit casing 102 confronting the partition wall must be set back a distance, indicated by L2, to provide an extra space to accommodate an end portion of each connector terminal 202 that is passed through the partition wall. The set-back distance L2 is as a matter of design equal to or greater than the length L1 of that end portion of the respective connector terminal 202, rendering the control unit housing 100 as a whole to be bulky in size.

In addition, alignment of the tip of that end portion of each connector terminal 202 with a corresponding perforation in the partition wall is indeed difficult to achieve and even the slight misalignment would require readjustment in position of the connector terminals 202 relative to the respective perforations in the partition wall. This complexity indeed increases the cost of manufacture.

Although the connector terminals 202 may be insert-molded together with the control unit housing 100 during the molding of the latter, a complicated and expensive mold would be required in such case, adding cost to the final product.

Also, considering a top surface area of the circuit casing 103 on one side of the partition wall opposite to the connector casing 201 defines a support base on which a hydraulic unit (not shown) including a hydraulic pump and a plurality of electronically controlled control valves is fixedly mounted, the provision of the set-back distance L2 results in a considerable reduction in efficiency of maximum utilization of the available space. In addition, since the structure shown in FIG. 6 requires the connector terminals 202 to be press-fitted into the corresponding apertures in the partition wall from the interior of the circuit casing 103, it is impossible to reduce the size of a portion where the connector terminals 202 are fixed even though they can be formed to have the same shape as the corresponding socket terminals in the plug-in connector, and a problem associated with reduction in physical strength of the partition wall would also occur if the connector terminals 202 are spaced a small pitch between the neighboring members of them.

U.S. Pat. No. 5,452,948, issued Sep. 26, 1995 to Cooper et al. discloses the electronically controlled hydraulic unit comprising, as reproduced in FIG. 6, the idea of bending coil leads or terminals, extending respectively from each of a plurality of electromagnetic coils, to provide resiliency so that the solder joints between circuit elements on a coil printed circuit board and the coil terminals can be substantially immune from being stressed when a compressive load is applied to the coil in a direction parallel to the coil terminals.

More specifically, referring to FIG. 7, Cooper et al. U.S. Patent discloses an electronically controlled hydraulic unit comprising a coil mounting housing 300 including a peripheral side wall 301 and a connector casing 302 both formed integrally therewith. Electromagnetic coils 303 each having a pair of coil terminals 306 are each seated on a respective coil mounting seat 304 having a snap-in, hold-down projection 305. The coil terminals 306 of each of the electromagnetic coils 303 are soldered at a free end thereof to circuit elements on a coil printed circuit board 307, but have a generally intermediate portion thereof bent to provide resiliency so that the solder joint will not be stressed when a compressive load is applied to the respective coil 303 in the direction parallel to the coil terminals 306 during mounting of the respective coil 303 onto the coil mounting housing 300.

The coil mounting housing 300 has a plurality of staking pins 308 protruding upright from a sealing rim extending inwardly from the bottom of the peripheral side wall 301. These staking pins 308 are, after the coil printed circuit board 307 has been mounted in the coil mounting housing 300 with its peripheral portion resting on the sealing rim through a sealing member 309, bent over to hold the printed circuit board securely in place. An electronic control unit printed circuit board 311 having a number of control elements 31 mounted thereon is positioned beneath the coil mounting housing 300 and is supported by connecting legs 312, which extend downwardly from a socket connector 302 and are then soldered to the electronic control unit printed circuit board 311, and also by pins 313 having one end fixed to the coil printed circuit board 307 so as to extend downwardly therefrom and soldered to the electronic control unit printed circuit board 311. After the component parts have been assembled, a lower cover 314 is secured from below to the coil mounting housing 300 to thereby maintain sealing integrity between the coil printed circuit board 307 and the coil mounting housing 300.

In this known electronically controlled hydraulic unit, the coil printed circuit board 307 is electrically connected with the electromagnetic coils 303 through the coil terminals 306 and is securely connected to the coil mounting housing 300 through the sealing member 309. On the other hand, the electronic control unit printed circuit board 311 are electrically and mechanically connected with the terminal legs 312 and the pins 313, respectively. Since the lower cover 314 when secured from below to the coil mounting housing 30 encloses the electronic control unit printed circuit board 311 in a substantially hermetic fashion, the various component parts can be fluid-tightly sealed.

According to Cooper et al. U.S. Patent, the coil terminals so bent as to provide resiliency appear effective to avoid the possibility of the solder joints from being stressed. However, the bending of the coil terminals for this purpose is required either before or after the coil terminals have been pierced under interference fit through the coil mounting seats. In either case, it has been found that some of the coil terminals are apt to deviate from the design dimension when they are bent and, therefore, alignment of the coil terminals with corresponding perforations in the coil printed circuit board appears to be difficult to achieve without complicated and time-consuming procedures.

In general, soldering is the most inexpensive and effective means for connecting connector terminals in an electrical connector with a printed circuit on a printed circuit board. However, the resultant solder joints have been found sensitive to external stresses such as, for example, thermal stresses generated in the circuit board or the like which would be brought about by change in ambient temperature.

SUMMARY OF THE INVENTION

Accordingly, the present invention has for its object to provide an improved electronic control unit wherein a plurality of connector terminals of a connector are provided with a buffer effective to absorb an external stress, can be accurately and precisely constrained in a housing and can provide a stabilized electrical connection with a high workability.

In order to accomplish this object, the present invention provides an electronic control unit including a unit housing of one-piece structure having a connector casing and a circuit casing both formed integrally therewith, a printed circuit board fixedly accommodated within the circuit casing, and one or more connector terminals adapted to be electrically connected to the printed circuit board and constrained by the unit housing. The or each connector terminal has a fixing portion and a connecting portion both defined therein along the length thereof and is held in position in the unit housing with the fixing portion press-fitted through a corresponding insertion aperture in the unit housing and then constrained entirely or partially by an entire peripheral surface defining the corresponding insertion aperture. The or each connector terminal also has a buffering portion defined therein at a location generally intermediate between the fixing and connecting portions thereof, and a projective shape of the fixing and buffering portions of the or each connector terminal in a direction conforming to the direction of press-fitting thereof is so chosen as to be encompassed within the shape of the insertion aperture.

Preferably, the or each connector terminal is in the form of an elongated plate having the buffering portion defined therein in a direction across the thickness thereof, and the fixing portion thereof has a width greater than that of the buffering portion whereby the connector terminal can be constrained by press-fitting the fixing portion into a portion of the insertion aperture. This is particularly advantageous in that while the connector terminal can be fixed in that portion of the insertion aperture, the buffering portion thereof can be passed through a space defined by a remaining portion of the insertion aperture in communication with that portion of the insertion aperture.

Again preferably, the unit housing may have a guide provided for the or each connector terminal and extending from the unit housing so as to surround the buffering portion thereof. The guide may have a space larger for the buffering portion, but smaller for a portion adjacent the connecting portion to allow it to be aligned with an outer peripheral surface of the connecting portion. This is particularly advantageous in that the connecting portion ahead of the buffering portion can be accurately guided through a corresponding through-hole in the printed circuit board.

According to the present invention, the presence of the buffering portion in the or each connector terminal is effective to absorb an external stress such as, for example, any possible dimensional change of peripheral component parts with change in atmospheric temperature because of the difference in coefficient of thermal expansion and, therefore, any possible breakage of the solder joint can be minimized.

Also, since the insertion aperture defined in the unit housing is so shaped as to allow the fixing and buffering portions of the or each connector terminal to pass therethrough, the or each connector having the buffering portion can easily and accurately be assembled in position and, hence, the or each connector terminal can precisely positioned and soldered relative to the printed circuit board.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE EMBODIMENTS

Figure 1:
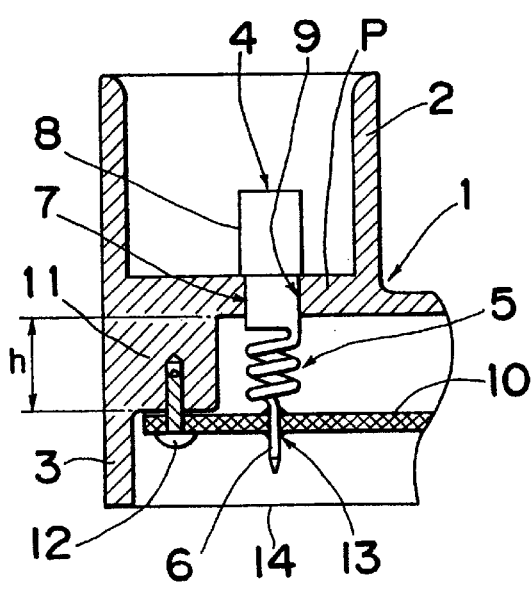
FIG. 1 is a fragmentary sectional representation of an electronic control unit according to a first preferred embodiment of the present invention.

Referring first to FIG. 1, an electronic control unit comprises a unit housing 1 of one-piece construction including a connector casing 2 and a circuit casing 3 both formed integrally therewith and a partition wall P intervening between the connector and circuit casings 2 and 3. A printed circuit board 10 is supported inside the circuit casing 3 and fixed in position by means of one or more set screws 12 such as, for example, drive screws that are threaded into a frame portion integral with the circuit casing 3. At least one connector terminal 4 having a connecting end 6, a fixing portion 7 and an engaging portion 8 defined therein at different locations over the length thereof is press-fitted through a corresponding insertion hole 9, defined in the partition wall P, with the connecting end 6 pierced through a corresponding through-hole in the printed circuit board 10. The connected end 6 so inserted through the through-hole is soldered to a circuit element on the printed circuit board 10 to establish an electric circuit between the connector terminal 4 and the printed circuit. After the soldering, a bottom opening of the circuit casing 3 remote from the connector casing 2 is fluid-tightly sealed by a cover (not shown) to thereby maintain the sealing integrity inside the circuit casing 3.

The engaging portion 8 of the connector terminal 4 which is engageable with and received in a corresponding terminal sheath in a mating connector (not shown) when the latter is plugged into the connector casing 2 may take any suitable shape, for example, rectangular or round. If the fixing portion 7 is undersized relative to the engaging portion 8, positioning can readily be accomplished, and the insertion hole 9 in the partition wall P may take any suitable shape provided that the fixing portion 7 can be fixed. Also, even where the plural connector terminals 4 are employed and are spacedly arranged at a relatively small pitch, the physical strength of portions of the partition wall P each between the neighboring insertion apertures 9 can be compensated for.

In addition to the connecting end 6, the fixing portion 7 and the engaging portion 8, the connector terminal 4 has a buffering portion 5 defined therein and located generally intermediate between the connecting end 6 and the fixing portion 7. The buffering portion should be effective to absorb an external force applied to the connector terminal 4 in a direction axially thereof and may take any suitable shape such as, for example, spiral, bent or U-shaped configuration for this purpose.

In the structure described above, even though a dimensional change attributable to change in atmospheric temperature occurs in a region h corresponding to the height of the frame portion 11 and the length of the connecting end 6 including the buffering portion 5, that is, in a space within the circuit casing 3 below the partition wall P, but above the printed circuit board 10, the buffering portion 5 having a flexibility absorbs it to avoid any possible breakage of the solder joint 13 which would result from material fatigue.

Figure 2A:
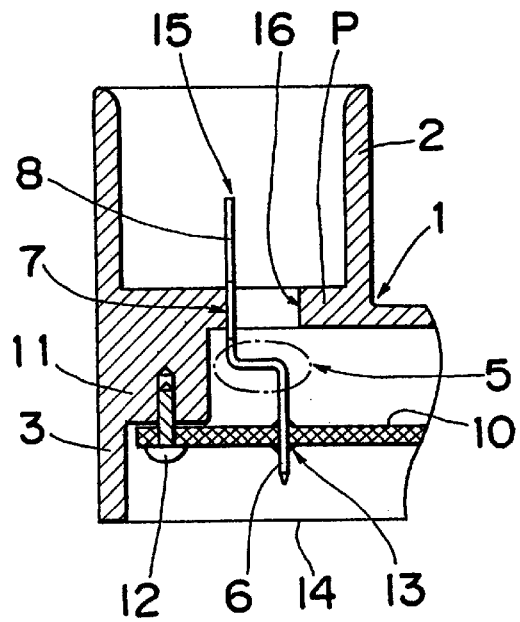
FIG. 2A is a view similar to FIG. 1, showing the electronic control unit according to another preferred embodiment of the present invention.
Figure 2B:
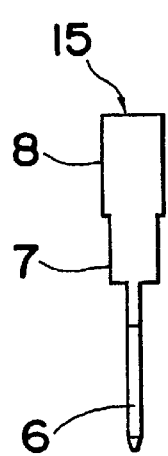
FIG. 2B is a front elevational view of a connector terminal employed in the embodiment shown in FIG. 2A.
Figure 2C:
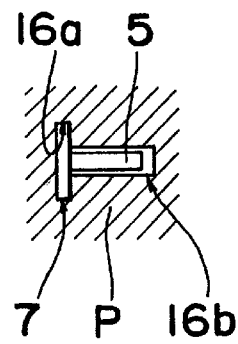
FIG. 2C is a schematic top sectional view showing an insertion aperture in a unit housing with the connector terminal of FIG. 2B inserted therein.

The electronic control unit according to another preferred embodiment of the present invention is shown in FIG. 2 including FIGS. 2A to 2C. As clearly shown in FIGS. 2A and 2B, the connector terminal identified by 15 is in the form of a generally elongated plate prepared from a metallic plate by the use of any known press work, having the buffering portion 5 formed by bending. This connector terminal 15 is more economical to make than the connector terminal 4 employed in the practice of the foregoing embodiment.

Also as clearly shown in FIGS. 2A and 2C, the insertion aperture defined in the partition wall P for fixedly receiving the corresponding connector terminal 15 with the fixing portion 7 press-fitted thereinto has a constraint region 16*a* of a shape generally similar to the shape of a split groove, where the fixing portion 7 is press-fitted, and a clearance 16*b* continued from and extending perpendicular to the constraint region 16*a* for the passage of the buffering portion 5 therethrough. In other words, the projective shape of the fixing and buffering portions 7 and 5 of the connector terminal 15 in a direction conforming to the direction of press-fitting thereof is encompassed within the shape of the insertion hole 16.

Figure 3:
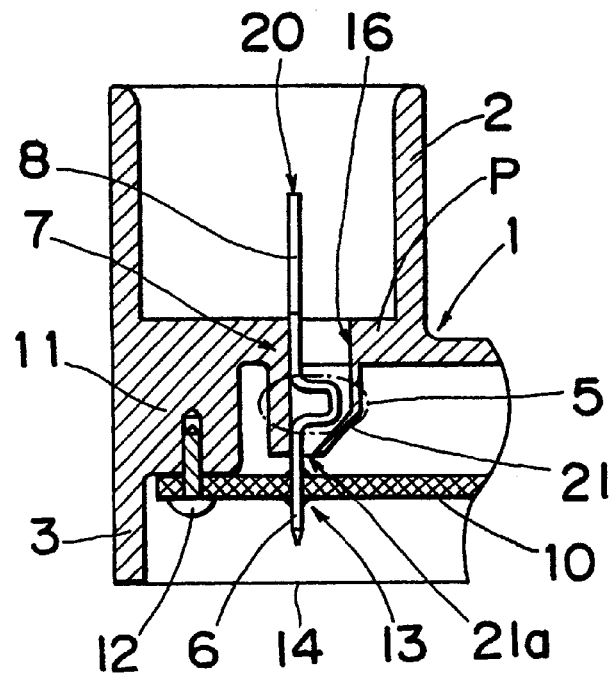
FIG. 3 is a view similar to FIG. 1, showing the electronic control unit according to a further preferred embodiment of the present invention.
Figure 4:
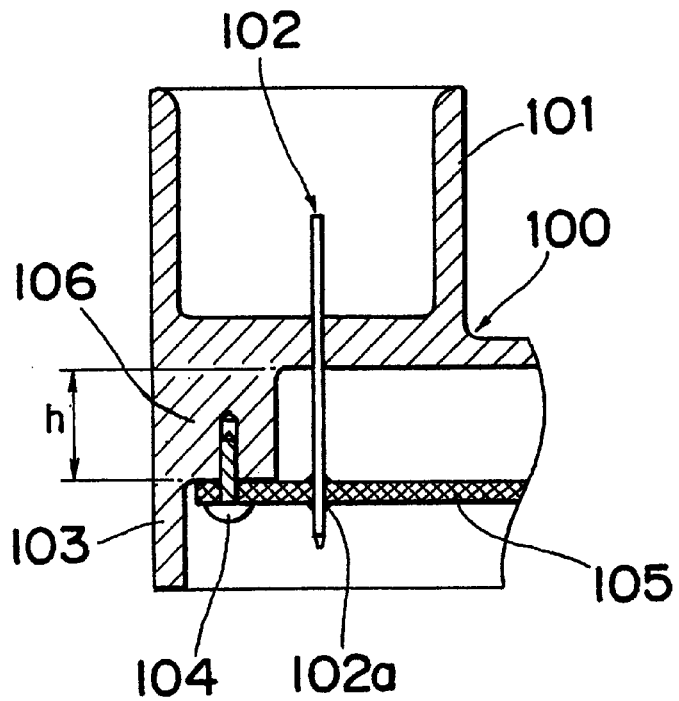
FIG. 4 is a fragmentary sectional view of the conventional electronic control unit, showing connection between the straight connector terminals and the printed circuit board.
Figure 5:
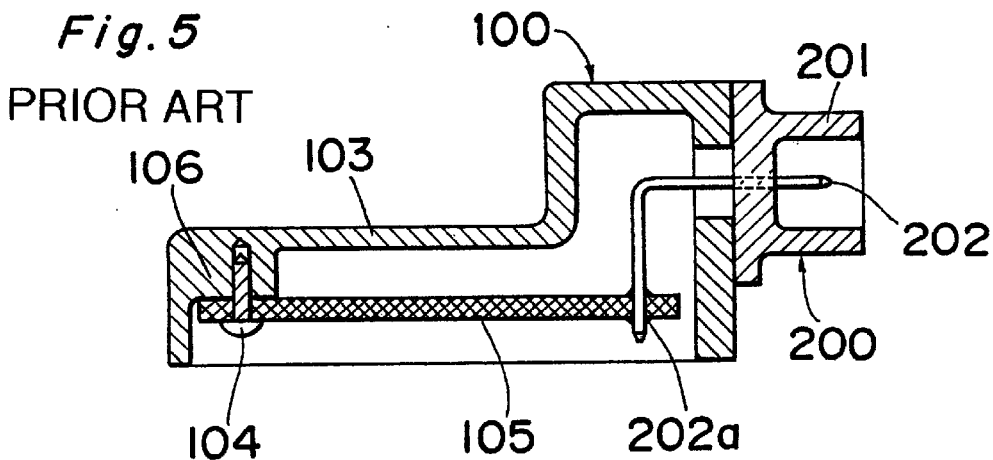
FIG. 5 is a schematic sectional view of the conventional electronic control unit of a type utilizing a connector subassembly connected with the printed circuit board.
Figure 6:
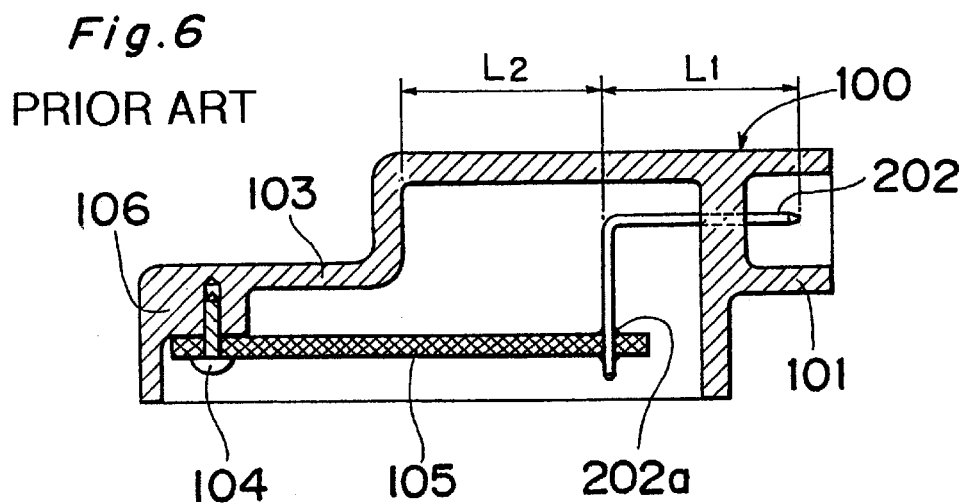
FIG. 6 is a schematic sectional view of the conventional electronic control unit, showing connection between the connector terminals having a bent and the printed circuit board.
Figure 7:
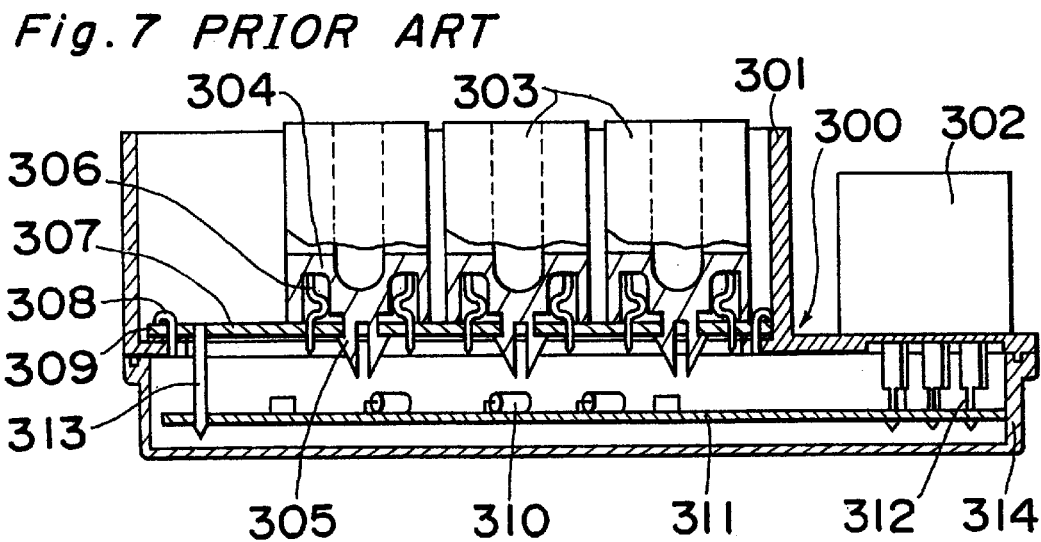
FIG. 7 is a transverse sectional view of the prior art electronically controlled hydraulic unit disclosed in Cooper et al. U.S. Pat. No. 5,452,948.

Referring now to FIG. 3 showing the electronic control unit according to a still further preferred embodiment of the present invention, the connector terminal identified by 20 is in the form of a generally elongated plate prepared from a metallic plate by the use of any known press work in a manner similar to that in the embodiment of FIG. 2. The insertion hole 16 defined in the partition wall P in the embodiment of FIG. 3 is of a shape substantially identical with that of the insertion hole 16 in the embodiment of FIG. 2.

However, the connector terminal 20 differs from the connector terminal 16 in the embodiment of FIG. 2 in that the buffering portion 5 defined in this connector terminal 20 is generally U-shaped by bending.

In addition, the partition wall P shown in FIG. 3 has a corresponding guide wall 21 extending downwardly from the partition wall P of the unit housing 1 while surrounding the buffering portion 5 of the respective connector terminal 20. This guide wall 21 has upper and lower open ends opposite to each other, the opening at the upper end thereof adjacent the partition wall P having a surface area large enough to loosely accommodate the buffering portion 5 of the connector terminal 20 therein. On the other hand, the opening 21*a* at the lower end of the guide wall 21 is so constricted as to permit a peripheral surface of the connecting end 6 of the connector terminal 20 to align with and touch an inner wall surface of the guide wall 21 so that when the respective connector terminal 20 is being inserted through the insertion hole 16 with the connecting end 6 oriented downwards, the connecting end 6 of the connector terminal 20 can advantageously be passed through the guide walls 21 while substantially accurately aligned with and guided towards the corresponding through-hole in the printed circuit board 10.

The guide wall 21 having the constricted open end 21*a* can be formed during the injection molding of the unit housing 1 with the use of a male mold for defining the inner peripheral surface of the guide wall 21 and having a shape sufficient to allow it to pass through the insertion hole 16.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An electronic control unit which comprises:
   a unit housing of one-piece structure having a connector casing and a circuit casing both formed integrally therewith, said unit housing having a partition wall positioned between the connector and circuit casings and having an insertion aperture of a predetermined shape defined in the partition wall;
   a printed circuit board fixedly accommodated within the circuit casing; and
   at least one connector terminal adapted to be electrically connected to the printed circuit board and constrained by the unit housing;
   said at least one connector terminal having a fixing portion, a buffering portion and a connecting portion both defined therein along a length thereof and held in position in the unit housing with the fixing portion press-fitted through the insertion aperture and then constrained by an entire peripheral surface defining the insertion aperture said connecting portion is fixed to said printed circuit board, said buffering portion being located generally intermediate between the fixing and connecting portions thereof, said buffering portion effective to absorb an external stress applied to the at least one connector terminal; and a projective shape of the fixing and buffering portions of the at least one connector terminal in a direction conforming to the direction of press-fitting thereof being so chosen as to be encompassed within the predetermined shape of the insertion aperture.

2. The electronic control unit as claimed in claim 1, wherein the at least one connector terminal is in the form of an elongated plate having the buffering portion defined therein in a direction across the thickness thereof, and the fixing portion thereof has a width greater than that of the buffering portion whereby the at least one connector terminal can be constrained by press-fitting the fixing portion into a portion of the insertion aperture.

3. The electronic control unit as claimed in claim 1, wherein the unit housing has a guide extending from the partition wall into the circuit casing so as to surround the buffering portion thereof, said guide having a space larger for the buffering portion, but smaller for a portion adjacent the connecting portion to allow it to be aligned with an outer peripheral surface of the connecting portion.

\* \* \* \* \*

UNITED STATES PATENT AND TRADEMARK OFFICE
CERTIFICATE OF CORRECTION

PATENT NO. : 6,155,856
DATED : December 5, 2000
INVENTOR(S) : S. Sanada

It is certified that error appears in the above-identified patent and that said Letters Patent is hereby corrected as shown below:

Column 8,
Line 66 (claim 1, line 19), after "aperture" insert -- , --.

Signed and Sealed this

Twenty-third Day of October, 2001

Attest:

NICHOLAS P. GODICI
Attesting Officer  Acting Director of the United States Patent and Trademark Office